(12) United States Patent
Brown (10) Patent No.: US 10,768,645 B2
(45) Date of Patent: Sep. 8, 2020

(54) DEVICES, SYSTEMS AND METHODS RELATING TO HVAC SYSTEMS THAT PROVIDE AN IMPLICIT PARTITION BETWEEN AT LEAST TWO ABUTTING ENVIRONMENTS IN A DEFINED LARGE OPEN SPACE

(71) Applicant: Roberts-Gordon LLC, Buffalo, NY (US)

(72) Inventor: Charles M. Brown, Bellevue, WA (US)

(73) Assignee: Roberts Gordon LLC, Buffalo, NY (US)

( * ) Notice: Subject to any disclaimer, the term of this patent is extended or adjusted under 35 U.S.C. 154(b) by 0 days.

(21) Appl. No.: 15/677,928

(22) Filed: Aug. 15, 2017

(65) Prior Publication Data

US 2018/0067508 A1    Mar. 8, 2018

Related U.S. Application Data (60) Provisional application No. 62/374,940, filed on Aug. 15, 2016.

(51) Int. Cl.
| | | |
|---|---|---|
| *G05D 23/19* | (2006.01) | |
| *F24F 11/30* | (2018.01) | |
| *F24F 11/54* | (2018.01) | |
| *F24F 110/10* | (2018.01) | |
| *F24F 11/46* | (2018.01) | |

(52) U.S. Cl.
CPC .......... *G05D 23/1934* (2013.01); *F24F 11/30* (2018.01); *F24F 11/46* (2018.01); *F24F 11/54* (2018.01); *F24F 2110/10* (2018.01); *F24F 2221/50* (2013.01)

(58) Field of Classification Search
CPC .................... G05D 23/1934; F24F 2221/50
See application file for complete search history.

(56) References Cited

U.S. PATENT DOCUMENTS

| | | | |
|---|---|---|---|
| 4,662,269 A | 5/1987 | Tartaglino | |
| 6,575,233 B1 * | 6/2003 | Krumnow | G05D 27/02 165/208 |
| 7,431,641 B2 * | 10/2008 | Darling | F24F 3/0442 454/333 |
| 9,297,541 B1 * | 3/2016 | McGillycuddy | F24D 13/00 |
| 2008/0277486 A1 | 11/2008 | Seem et al. | |
| 2010/0012737 A1 * | 1/2010 | Kates | F24F 11/0012 236/49.3 |

(Continued)

OTHER PUBLICATIONS

International Search Report relating to International Application No. PCT/US2017/047015 filed Aug. 15, 2017, dated Nov. 29, 2017, 4 pages.

*Primary Examiner* — Thomas C Lee
*Assistant Examiner* — Charles Cai
(74) *Attorney, Agent, or Firm* — King IP Law; Joshua King (57) ABSTRACT

Systems, devices and methods, etc., comprising at least two separate and distinct environmental climate control devices that both serve the mixed use open space, and which environmental climate control devices are centrally controlled to provide at least two different HVAC-controlled zones, for example to differentiate between the zones according to at least one of temperature, humidity, pressure or contaminant level.

42 Claims, 3 Drawing Sheets

(56) References Cited

U.S. PATENT DOCUMENTS

| | | |
|---|---|---|
| 2011/0066465 A1 | 3/2011 | Orfield |
| 2013/0031928 A1 | 2/2013 | Kim |
| 2013/0245836 A1* | 9/2013 | Goodfellow ......... F24F 11/0001 700/276 |
| 2014/0260692 A1* | 9/2014 | Sharp ................... G01N 1/2273 73/863.23 |
| 2015/0204551 A1* | 7/2015 | Nair ........................ F24F 11/70 165/217 |
| 2015/0219382 A1* | 8/2015 | Uselton ............... F24F 11/0001 454/258 |
| 2016/0091217 A1 | 3/2016 | Verberkt et al. |
| 2017/0254553 A1* | 9/2017 | Leal ....................... G05B 15/02 |

* cited by examiner

DEVICES, SYSTEMS AND METHODS RELATING TO HVAC SYSTEMS THAT PROVIDE AN IMPLICIT PARTITION BETWEEN AT LEAST TWO ABUTTING ENVIRONMENTS IN A DEFINED LARGE OPEN SPACE

CROSS-REFERENCE TO RELATED APPLICATIONS

The present application claims the benefit of U.S. Provisional Patent Application Ser. No. 62/374,940, filed Aug. 15, 2016, which application is incorporated herein by reference in its entirety.

BACKGROUND

Heating, ventilation and air conditioning (HV AC) is the technology of indoor and environmental comfort. (Various references are set forth herein, including in the Cross-Reference To Related Applications, that discuss certain systems, apparatus, methods and other information; all such references are incorporated herein by reference in their entirety and for all their teachings and disclosures, regardless of where the references may appear in this application. Citation to a reference herein is not an admission that such reference constitutes prior art to the current application.)

HVAC systems can comprise a plurality of different, distinct environmental climate control devices, such as two or more of, a) a radiant heater, which can comprise a burner; at least one heat exchanger tube, a tube to carry the combustion gasses, and a reflector to direct the heat that is generated; b) an indirect or direct fired air heater, which discharge heated air directly or through ducts within a building or structure; c) an air conditioner/cooler to condition interior air for recirculation, and d) a dedicated air conditioning/cooling system (DOAS) for delivering outdoor air ventilation that handles both the latent and sensible loads of conditioning the ventilation air (see, e.g., U.S. Provisional patent application Ser. No. 15/406,703, filed Jan. 14, 2017 and entitled HVAC System Comprising Independently Variable Refrigerant Flow (VRF) And Variable Air Flow (VAF)"). Other HVAC elements can also be included with, or instead of, the HVAC elements listed above, such as exhaust fans, ventilators, etc.

A goal of an HVAC system is to provide thermal comfort and acceptable indoor air quality. This goal can be particularly difficult where a large open space such as a warehouse, a shopping mall, storage facility, a distribution center, a factory or an ice rink, that has at least two different zones that each has a different use. For example, where one such area being occupied by people and the other being unoccupied by people but containing products benefitting from cooler temperatures, or where two different zones in a large open space are both occupied but the people using the zones have different needs, for example an ice skating rink where the hockey players benefit from colder air while the watching audience wants to be warmer. Thus, the two different-use zones require different heating, cooling, ventilation, humidity, etc., needs within different areas within that large open space.

Despite decades of effort to increase the efficiency of, and reduce the energy demands of HVAC systems, present HVAC systems are not as efficient as possible and require unnecessary amounts of energy.

Thus, there has gone unmet a need for improved methods of increasing the efficiency and/or energy usage of HVAC systems.

The present systems and methods, etc., increase the efficiency of, and reduce the energy demands of, HVAC systems, and/or provide other advantages.

SUMMARY

The systems, devices, methods, etc., herein increase the efficiency of, and reduce the energy demands of, HVAC systems in situations where a large, multi-use open space benefits from having two, three or more distinct environmental climate zones separated by implicit partitions created by the HVAC systems herein. The systems, devices, methods, etc., herein include at least two separate and distinct environmental climate control devices (i.e., separate environmental climate control devices indicates that such devices are independently acting; distinct environmental climate control devices indicates that such devices are different types of environmental climate control devices, such as infrared heaters compared to direct/indirect fired heaters compared to cooling units). Such separate and distinct environmental climate control devices serve the mixed-use open space, and such devices are centrally controlled to provide at the least two different HVAC-controlled zones that abut each other, for example to differentiate between the zones according to at least one of temperature, or contaminant level. In some embodiments, the environmental climate control devices can be of a same type. i.e., separate but not distinct, and the at least two HVAC-controlled zones or environments, can be separated by a reasonable distance instead of abutting each other.

The at least two distinct environmental climate control devices, which run under their own independent control as desired and/or as manufactured, are under control of a coordinated controller, which can be effected for example via distributed controllers or a single controller, which is/are known as a central uniform control unit. The central uniform control unit is also operably connected to at one or more sensors or other detection devices that detect environmental conditions within the different environmental zones. The detection devices provide feedback, directly or indirectly, to the central uniform control unit so that the central uniform control unit can adjust, for example in real-time or as desired, one, two, three, or more of the HVAC units to create and/or maintain (i.e., establish) the at least two abutting environments. Such sensors can be, for example, at least a first temperature sensor located in the first selected temperature zone and to a second temperature sensor located in a second selected temperature zone.

The central uniform control unit is configured to modify or regulate the functioning of the environmental climate control devices to adjust for changes in factors that affect the zones, including real-time data such as internal (in the zone) temperature fluctuations, external (e.g., outside the building) temperature fluctuations, contaminant fluctuations, and/or pressure fluctuations. Thus, based on such inputs as well as specific set points for one or more of a range of parameters and environmental conditions such as desired temperature, contaminant conditions, humidity, pressure, etc. for the different environmental zones, the central uniform control unit controls combined operation of the at least two distinct environmental climate control devices to establish the implicit partition between the first and second selected temperature zones such that the first and second selected temperature zones respectively have substantially different HVAC characteristics, such as temperatures, or humidity or contaminant levels. One example of such a system is the VIRTUAL WALL™ HVAC system provided by Roberts Gordon LLC.

Such systems can provide enhanced comfort for users and improved energy usage, and/or other benefits. For example, they can achieve one or more of the following advantages:
a. Integrated system of heating cooling and ventilation equipment.
b. Optimize energy usage in large open spaces with mixed use between occupied and unoccupied areas.
c. Energy usage 40% less BTU requirements as compared to ASHRAE 90.1 2010 baseline
d. Supplier provided intuitive graphical user interface showing equipment status in real-time.
e. Provide access to zone settings allowing user to adjust accordingly.
f. Adjust set points and control properties for both occupied and unoccupied modes.
g. Uses open protocol allowing communication over internet, Intranet and modem cells, without special software.
h. Flexible trending provides user historical operation data to review building conditions.

In one embodiment, the direct fired heaters and radiant heaters and other heating and/or cooling environmental climate control devices are used in large areas, for example, a warehouse, a shopping mall, storage facility, a distribution center, a factory or an ice rink, that has spaces that are occupied by individuals and other spaces that are normally unoccupied by individuals. The direct fired heaters assist in maintaining a selected temperature for the overall interior environment, while the radiant heaters create an enveloped heated area within the interior environment that encourages particular uses within a specific area. The two separate and distinct heaters (and other heating and/or cooling environmental climate control devices) are, however, separate and distinct components that operate apart from each other.

The present systems, methods, etc., integrate controls that regulate at least different two heating, ventilation and/or cooling environmental climate control devices, for example the above-identified disparate heaters under a uniform control unit in order to balance the workload to obtain a more efficient heating system and also save money. Other heating and/or cooling environmental climate control devices such as other heater types, air conditioners, ventilators and equivalents thereof that normally operate through distinct operating units can also be used. By capitalizing on an implicit partition that controls at least two (2) heating and/or cooling environmental climate control devices centrally to achieve optimal energy usage in large open spaces that have mixed use between concentrated areas of people and areas that are not usually occupied by people then a more efficient environmentally controlled building is obtained that also saves money.

Thus, in some aspects, the current systems, methods, etc., include heating ventilation cooling (HVAC) systems comprising:
at least two separate and distinct environmental climate control devices, the two distinct environmental climate control devices both serving a mixed use open space having at least a first selected temperature zone abutting a second selected temperature zone;
a central uniform control unit operably connected to the at least two environmental climate control devices to control combined operation of the distinct environmental climate control devices, the central uniform control unit also operably connected to at least a first temperature sensor located in the first selected temperature zone and to a second temperature sensor located in a second selected temperature zone; wherein, the central uniform control unit can be further configured such that, based on a first selected temperature set point for the first selected temperature zone, a second selected temperature set point for the second selected temperature zone, which second selected temperature set point can be different from the first selected temperature set point, and on information from the first and second temperature sensors, the central uniform control unit controls combined operation of the at least two distinct environmental climate control devices to establish substantially different temperatures between the first and second selected temperature zones. In some embodiments, such separate zones are divided and defined by an implicit partition created by the centralized control of such disparate devices based on information including sensor data. Such systems provide significantly enhanced energy savings and in some cases increased user comfort, as well as increased flexibility in how different zones with the large open space are utilized.

In some embodiments, the at least two distinct environmental climate control devices can comprise at least one radiant heater and at least one direct or indirect fired heater. The central uniform control unit can control equipment staging for the direct fired heater based on information from a pressure sensor centrally located in the mixed use open space and operably connected to the central uniform control unit.

The at least two distinct environmental climate control devices can comprise at least one climate control heating device and at least one climate control cooling device. The at least two distinct environmental climate control devices can comprise at least two climate control heating devices and at least one climate control cooling device. The at least two distinct environmental climate control devices further can comprise at least one ventilation device, and the central uniform control unit controls, via the ventilation device, ventilation in the mixed use open space to support the substantially different temperatures between the first and second selected temperature zones.

The system further can comprise at least one pressure sensor operably connected to the central uniform control unit such that the central uniform control unit selectively controls air pressure in the mixed use open space to support the substantially different temperatures between the first and second selected temperature zones, and can comprise at least one contaminant sensor operably connected to the central uniform control unit such that the central uniform control unit selectively controls HVAC in the mixed use open space based on information provided by the contaminant sensor. The contaminant can comprise at least one of carbon monoxide (CO) or nitrous oxide (NOX).

The first selected temperature zone having the first temperature can be configured to be occupied by people and the selected temperature zone having the second, substantially different temperature can be configured to not be occupied by people. The system further can comprise at least one occupancy sensor operably connected to the central uniform control unit. The central uniform control unit can be configured to adjust the temperature in the first selected temperature zone when the occupancy sensor senses people in the first selected temperature zone. The large open space can be at least one of a warehouse, a shopping mall, storage facility, a distribution center, a factory or an ice rink.

The central uniform control unit can control the distinct environmental climate control devices to provide outside air in quantities greater than needed solely for heating of the first and second selected temperature zones, and can control equipment staging for the direct fired heaters based on the centralized pressure control.

In further aspects, the systems, etc., herein include heating ventilation cooling (HVAC) systems comprising:

at least two separate environmental climate control devices, the at least two separate environmental climate control devices both serving a mixed use open space having at least a first selected HVAC-controlled zone abutting a second selected HVAC-controlled zone;

a central uniform control unit operably connected to the at least two environmental climate control devices, the central uniform control unit operably connected to at least one detection device providing information about at least one HVAC-conditioned quality in the mixed use open space; wherein, the central uniform control unit can be further configured such that, based on a first selected HVAC set point for the first selected HVAC-controlled zone, a second selected HVAC set point for the second selected HVAC-controlled zone, which second selected HVAC set point can be different from the first selected HVAC set point, and on information from detection device, the central uniform control unit controls combined operation of the at least two distinct environmental climate control devices to establish substantially different temperatures between the first and second selected temperature zones.

Also included herein are methods comprising manufacturing and/or using systems and devices as discussed herein, which methods can include establishing an implicit partition as discussed herein.

These and other aspects, features and embodiments are set forth within this application, including the following Detailed Description and attached drawings. Unless expressly stated otherwise, all embodiments, aspects, features, etc., can be mixed and matched, combined and permuted in any desired manner.

DETAILED DESCRIPTION

The present systems and methods, etc., provide approaches able to create a "implicit partition" between adjoining spaces located within a single large open space, for example a warehouse that has both occupied and non-occupied zones. The implicit partition separates two different environmental climates in each of the spaces via careful, centralized control of HVAC units serving the large open space.

Figure 1:
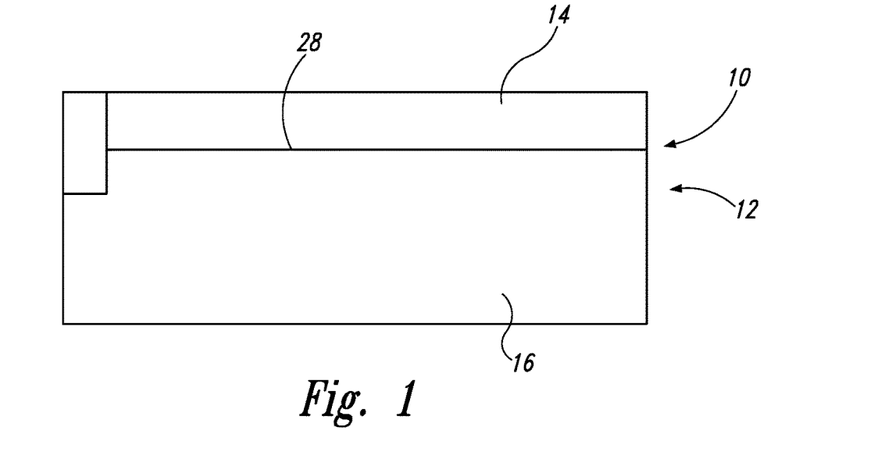
FIG. 1 schematically depicts a building comprising a large, mixed use open space.

Turning to the Figures. FIG. 1 depicts schematically a building 10 comprising a large, mixed use open space 12, which in turn comprises a first selected HVAC-controlled zone 14 abutting a second selected HVAC-controlled zone 16. First selected HVAC-controlled zone 14 and second selected HVAC-controlled zone 16 are separated by an implicit partition 28.

Figure 2:
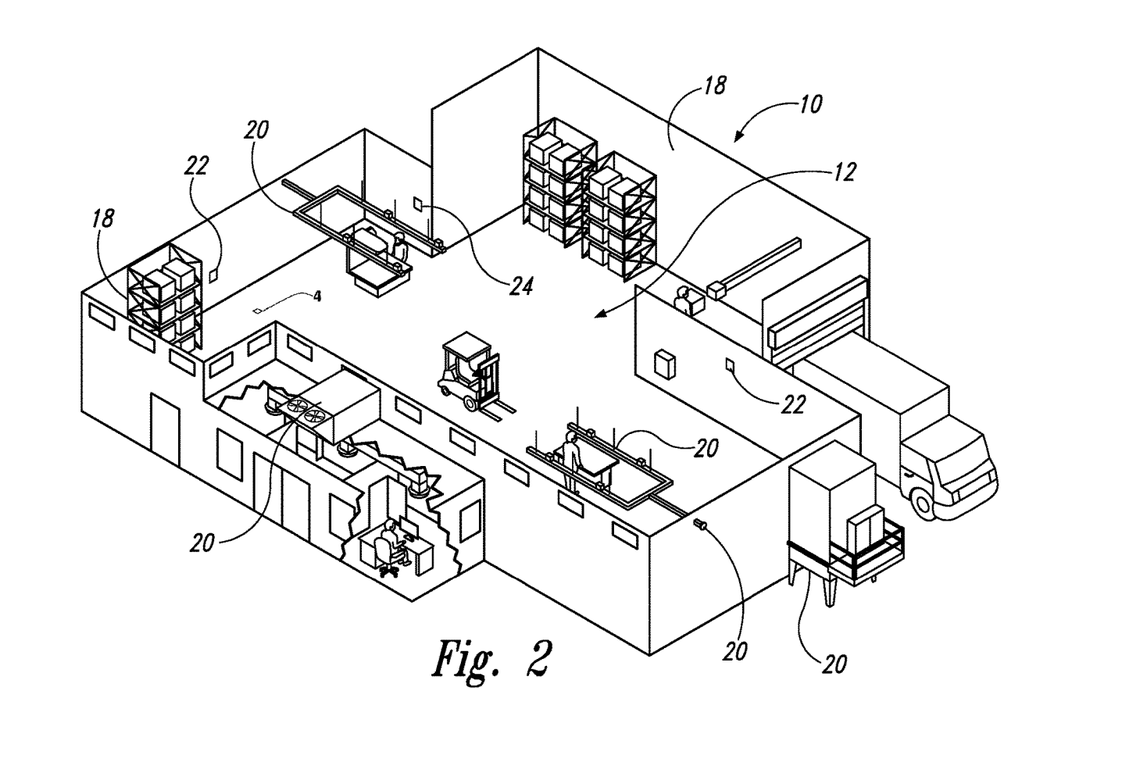
FIG. 2 depicts schematically a building comprising a large, mixed use open space wherein the large, mixed use open space is not a pure rectangle.

FIG. 2 depicts schematically a building 10 comprising a large, mixed use open space 12 wherein the large, mixed use open space 12 that is not a pure rectangle as in FIG. 1 but instead comprises a plurality of pockets 18 such as storage rooms 4 within the large, open space; such pockets are not separated by physical, structural walls to define the different spaces but instead are substantially open along at least one side to the remainder of the large open space. Large open space 12 comprises a plurality of environmental climate control devices 20 such as radiant heaters 1, direct or indirect fired heaters 2, an air conditioner/cooler 3, which can be a dedicated air conditioning/cooling system (DOAS) and/or an interior-air conditioner; when acting as a DOAS, it delivers outdoor air ventilation that handles both the latent and sensible loads of conditioning the ventilation air. FIG. 2 also depicts schematically temperature sensors 22 and pressure sensor 24, which provide feedback data and information to the various environmental climate control devices 20 and central uniform control unit 5.

Radiant heaters 1 can be, for example, standard or custom designed ROBERTS GORDON® Infrared Heating systems, which are engineered to provide even heat and uniform comfort throughout relevant occupied spaces. In such radiant heaters 1, infrared energy passes directly through space (air) in the large open space to heat objects and occupants below. As warmth is absorbed, energy re-radiates in the space. Using the implicit partition systems herein, modulating and zoning capabilities automatically respond to heat requirements in each area, providing heat only where desired, which can result in significant energy savings.

Direct or indirect fired heaters 2 can be, for example, RAPID® or Weather-Rite® direct-fired air management systems, or the Weather-Rite® IDF indirect-fired air management system. Such direct or indirect fired heaters 2 brings in tempered air during heating periods and non-tempered air during warmer periods to efficiently establish and maintain a mild, pressurized condition in the facility. Direct or indirect fired heaters 2, particularly when coupled with the other elements of the systems herein, can provide improved indoor air quality and deliver base-level heating for occupied and unoccupied areas. In some embodiments, neither the direct-fired/indirect-fired nor radiant heating unit can handle the heating load on its own during a design temperature day, and thus in such embodiments it is the controlled combination by the central uniform control unit of both of these systems that is particularly helpful.

Further, direct or indirect fired heaters 2 can provide pressurization forces that force airborne particulate out, reduces drafts around openings and improves comfort during colder months. Direct or indirect fired heaters 2 can also increase operating efficiency by delivering all desired available heat to the specified HVAC-controlled zone with the large open space, or to the large open space as a whole if needed. The combustion in direct or indirect fired heaters 2 can create natural humidity, which can enhance comfort and reduces bothersome static electricity that can negatively impact production processes.

Air conditioning/cooling system 3 can be an ADDISON® dedicated outdoor air system, and can be a flexible, pre-packaged unit that provide ventilation air for industrial or non-industrial applications where variable seasonal cooling is desired. Such air conditioning/cooling system 3 can be configurable with exhaust air energy recovery to reduce heating/cooling loads associated with fresh air supply. Air conditioning/cooling system 3 can also respond to building changes to reduce ventilation rates during low occupancy periods, and can provide options to deliver optimum energy efficiency, while meeting ventilation code requirements or other desired ventilation levels, for example in commercial spaces.

Central uniform control unit 5, which can also be referred to as an implicit partition controller such as the VIRTUAL WALL™ controller offered by Roberts Gordon LLC, controls in combination each of the environmental climate control devices 20 to establish the implicit partition as discussed herein. Facilities manager 6 has convenient control over all HVAC systems within the implicit partition system from a single access point, although multiple access points are provided. Thus, using the central uniform control unit 5, users can easily control space conditions by partitioning large spaces into separate zones.

Figure 3:
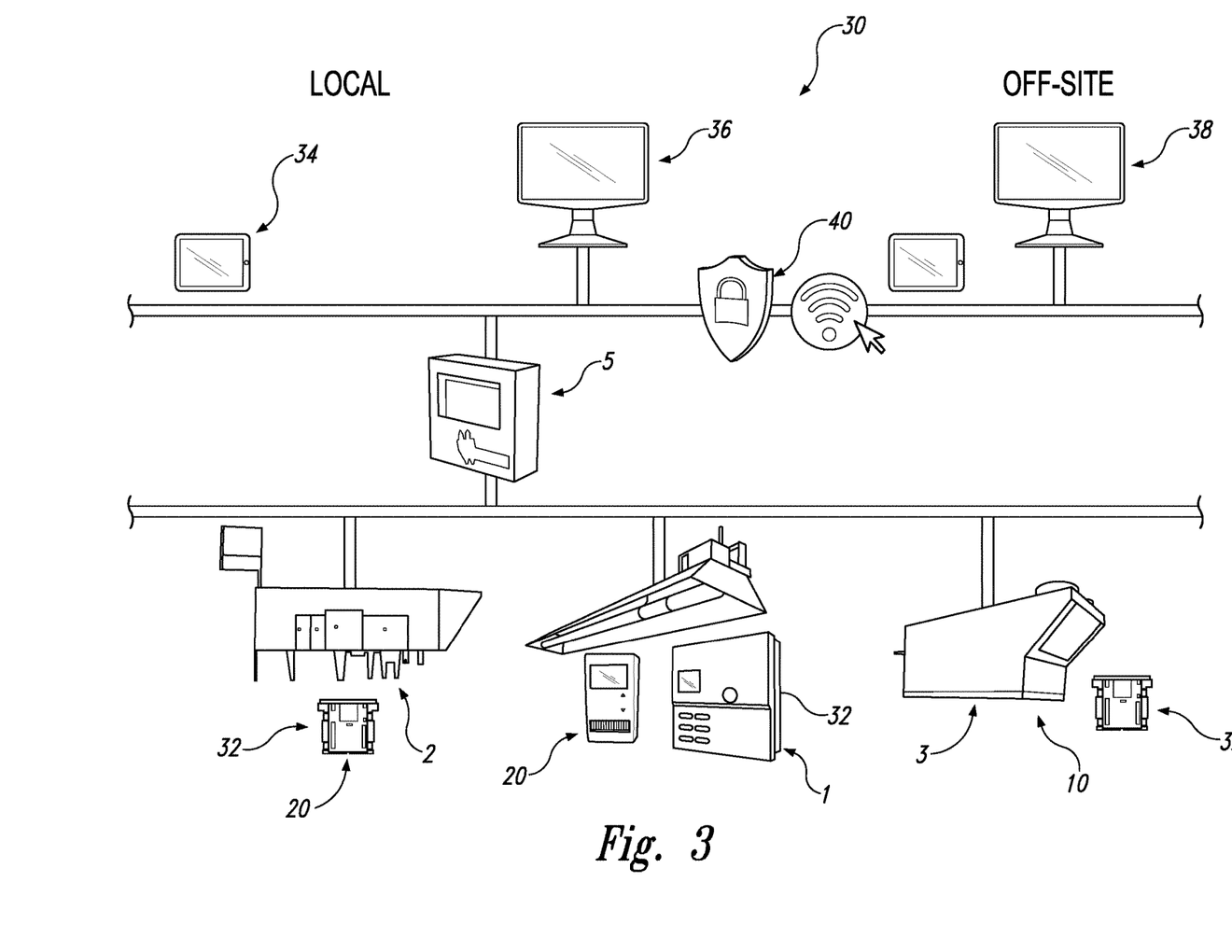
FIG. 3 schematically depicts an exemplary set of operable connections of various components of the systems herein.

FIG. 3 schematically depicts an exemplary set of operable connections 30 of various components of the systems herein. Environmental climate control devices 20 include radiant heater 1, direct or indirect fired heaters 2, and air conditioning/cooling system 3. Each of such environmental climate control devices 20, in the embodiment depicted, includes its own independent device controller 32 as well as operable connection to the central uniform control unit 5, which as depicted is located in a locally hosted web-server software package, but can be provided in any suitable form including for example cloud computing. Also operably connected to the central uniform control unit 5 are a variety of exemplary user interfaces such as a tablet/handheld device 34, which can have a touchscreen interface for parameter adjustments, scheduling, access individual equipment controller files, which can have a browser or dedicated app, local intranet computer 36, and an off-site, internet connected computer 38, which off-site computer will typically comprise a firewall 40 or other protective devices and/or software (all other computing devices should likewise have such protection). Wireless internet access can also be implemented, if desired, through other systems such as use of a cellular modem.

Figure 4:
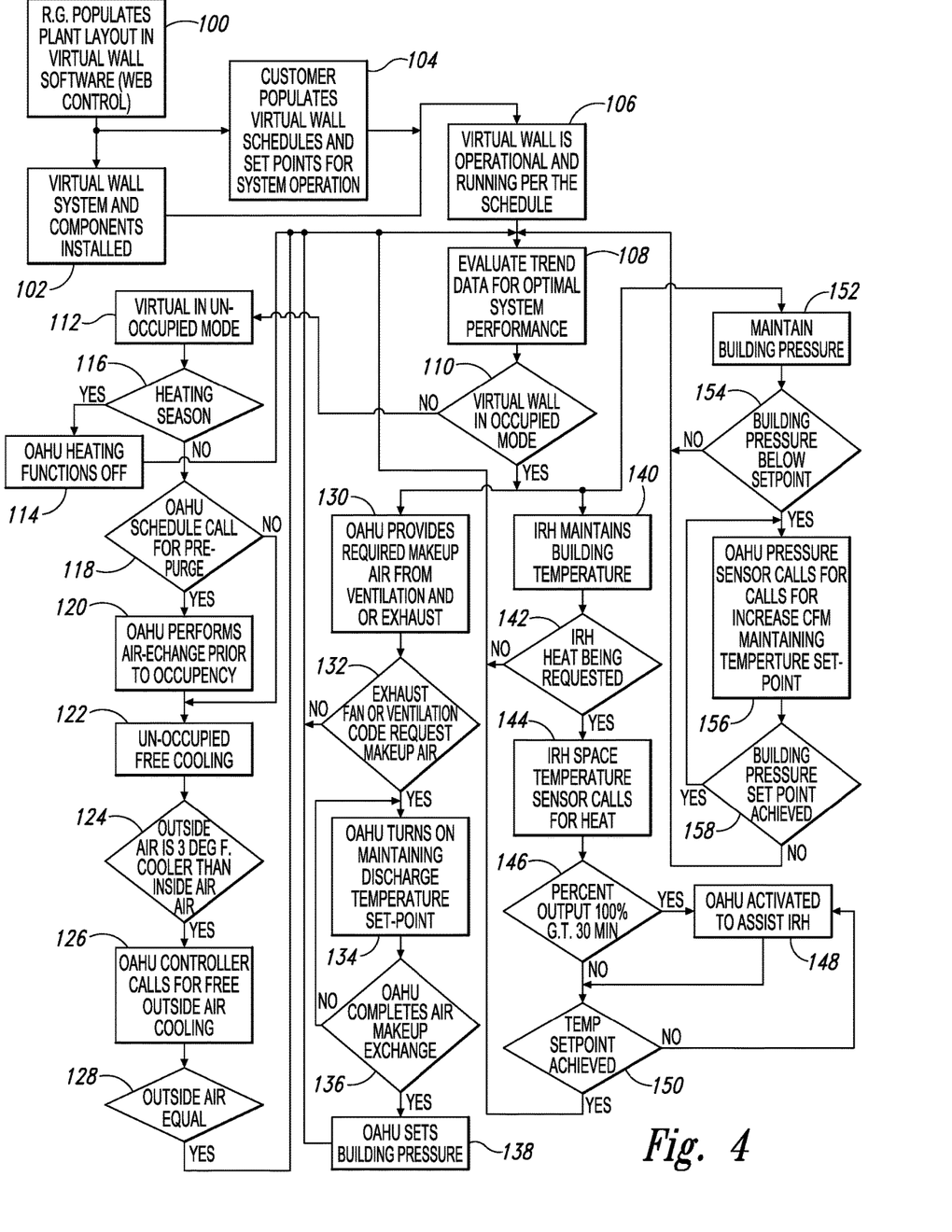
FIG. 4 depicts an exemplary flow chart for one embodiment of implementing methods associated with the systems, etc., herein.

FIG. 4 depicts an exemplary flow chart for one embodiment of implementing methods associated with the systems, etc., herein. In FIG. 4, start box 100 provides a large open space having plurality of distinct HVAC units (environmental climate control devices 20) and a central controller (central uniform control unit 5). Installation step 102 confirms that the implicit partition system components are installed for operation, while in set points step 104 a user provided schedules, temperature set points, humidity set points, etc. In confirmation step 106, the system if operational and running according the parameters previously established. In trend data evaluation step 108, trend data from sensors and the like are evaluated to determine system changes that may be made to improve performance.

Occupied mode 110 and unoccupied mode 112 represent two possible states that warrant establishing the implicit partition discussed herein; occupied steps 130-150 demonstrate exemplary appropriate steps to take when a zone is occupied, while steps unoccupied steps 114-128 demonstrate exemplary appropriate steps to take when a zone is unoccupied. Pressure steps 152-158 demonstrate exemplary appropriate steps to take to achieve desired building pressure.

A further example of operation of the systems, methods, etc., herein can be as follows:
1. General:
    a. Each distinct environmental climate control device of the HVAC equipment operates in stand-alone mode according to its stand-alone sequence of operations in the absence of, or absence of instructions from, the central uniform control unit, also known as an implicit partition controller. The central uniform control unit centrally coordinates one or more, or all of, inputs from different sensors and/or information sources such as user-selected set points or feedback information sources. Specific factors can include local temperature, occupancy, pressure control, heating set points, cooling set points and miscellaneous exhaust fans.
2. Exemplary distinct environmental climate control devices:
    a. Infrared Heating unit (IRH).
        i. Control of building heating.
        ii. Radiant heat to be installed where needed.
    b. Outside Air Handling Unit (OAHU)
        i. Control of Building air quality conditions by providing required make up air and baseline heating for building. The system can provide the following
            1. Heating
            2. Cooling
            3. Ventilation
            4. Monitoring of Gases (CO, CO2, NOX, H)
        ii. Dedicated Outdoor Air System (DOAS)
            1. Control of Office Environment
                a. Treated Air
                b. Heating
                c. Cooling
                d. Monitoring of Gases (CO, CO2, NOX, H)
    c. Direct Fired Heater.
        i. discharge heated air through ducts within a building or structure
3. Exemplary occupied temperature zone component interaction and discussion:
    a. OAHU is cycled on and operates according to the occupancy schedule set in the central uniform control unit (Implicit partition Controller).
    b. IRH maintains space temperature heating set points according to its occupancy schedule.
    c. Should the IRH be operating at 100% capacity and not be able to achieve or maintain the space temperature heating set point after the prescribed adjustable runtime (e.g., 30 minutes adj.), the discharge air temperature set point of the OAHU is raised in inverse proportion to the outside air temperature to supplement the heating capacity of the IRH system.
    d. Once the space temperature heating set point is achieved, the OAHU is returned to its normal temperature control and the IRH controller modulates the vacuum pump and cycles the burners to maintain space temperature heating set points.
    e. Building Static Pressure.
        i. Building Pressure is maintained at the higher of:
        ii. Positive Adjustable Pressure (e.g., 0.01" water column ("wc") (adj) relative to outside the building.
        iii. Regulate outside Air CFM as measured and defined by Code or process settings.
        iv. OAHU units using variable speed drives (VSDs) operate their fans at the minimum prescribed speed for the current mode of operation (e.g., heating, ventilation only, or cooling as desired).

f. Exhaust Fans Control cycle on according to selected conditions, such as the following, which can be user selectable:
   i. Continuous run
   ii. Upon a rise in temperature above space temperature cooling set points
   iii. Exceeding air quality conditions according to a specialized gas sensor (CO, $CO_2$, NOX, H, etc.)
4. Exemplary unoccupied temperature zone component interaction and discussion:
   a. For the unoccupied zone, the Exhaust Fans (EFs) and Outside Air Handling Unit (OAHU) are off. The Infrared Heat (IRH) are cycle to maintain the space unoccupied setpoint.
   b. In cooling season, if the night time outside air conditions (temperature or enthalpy, if applicable) are suitable and the outside air ("OA") temperature is at least 3° F. lower than the space temperature, the implicit partition controller operates the OAHU to provide free cooling to pre-cool the space and take advantage of the OA conditions
   c. If desired, the system can perform a pre-occupancy purge by staging on the exhaust fans and OAHU prior to the start of occupancy by a user adjustable time period to ensure sufficient air change. OA limits can be provided to prevent the purge operation during times when the OA conditions are unsuitable (excessively cold or hot); this can be configured by the user The discussion now turns to some further discussion of exemplary HVAC units and elements that can be used within the systems, methods, etc., herein.

Generally, and without limitation, radiant heaters provide radiant heat (as opposed, e.g., to convection-based heat). Common components of radiant heaters include but are not limited to: a burner; at least one hot roller, heat treated, steel, or coated aluminized tube that can be straight, elbowed at for example 45 or 90 degrees, crossed, or tee-shaped; a reflector with or without a top aperture normally made of aluminum or stainless steel, a flexible gas line with a shut-off cock, a combustion chamber, coupling assembly with lock, end vents, and tube adaptor. Exemplary conventional reflectors for radiant heaters are shown in Trombe, U.S. Pat. No. 3,310,102. U.S. patent application publication number 2011/0049253, Catteau, et al., provides examples of (a) certain aspects of how conventional radiant heaters operate, (b) typical conventional radiant heater component parts, and (c) some variations of the above-identified reflector shapes. Additional exemplary disclosures of radiant heaters can be found in U.S. Pat. No. 7,489,858 to Zank et al.; and, U.S. Pat. No. 5,626,125 to Eaves.

Examples of radiant heaters include the CoRayVac® brand low intensity radiant heater from Roberts Gordon, which provides provide infrared heating and uses modulating burners-in-series. Burners-in series allows for maximum heat coverage in the space, minimizing building exhaust penetrations. With a range of Btu/h inputs available, burners can be placed 10 ft-70 ft apart for uniform heat coverage. Suitable radiant heater controllers include, for example, the UltraVac® brand (U.S. Pat. No. 5,211,331) modulating controller that offers continuous modulation of the system and constantly adjusts fuel and combustion air, and the CoRayVac® modulating controller.

Generally, and without limitation, direct fired recirculating industrial air heaters are operable to discharge heated air through ducts within a building or structure, such as a warehouse, a shopping mall, storage facility, a distribution center, a factory or an ice rink or the like. Typically, the amount of heat added by the direct fired heater in proportion to the amount of outdoor air being introduced into the building is below a predetermined maximum temperature rise value. For example, ANSI Z83.18 2017 specifies one example of the amount of heat added in proportion to the amount of outdoor air introduced into the direct fired heater. The standard sets a defined allowable temperature rise based upon the actual percentage of outdoor air being inducted into the direct fired heater. The defined temperature rise is determined by the percentage of outdoor air and a "k" factor associated with the type of fuel that is used for heating the building. For example, the k factor for natural gas is 1.04. This element is intended to limit the potential for excessive accumulation of carbon dioxide ($CO_2$) within the building. Exemplary systems, including exemplary burners, are shown in U.S. Pat. Nos. 3,051,464; 3,178,161 and 3,297,259.

Turning to a discussion of exemplary controllers for individual HVAC units, such controllers function to maintain the interior temperature of a building at a particular nominal or set point temperature. The individual, self-contained control of a HVAC unit, when such a self-controlled unit is included in the systems herein (as opposed, for example, to systems wherein all aspects are controlled by the central uniform control unit) can be accomplished by the use of thermostats that sense the actual, real-time temperature in a particular building space. When the temperature deviates from the set point temperature by a predetermined amount, the thermostat activates the HVAC unit to bring the building temperature back to the set point temperature.

Some thermostats also provide a set-back function which changes the building interior temperature to a predetermined set-back temperature during the hours when the building is unoccupied. These set-back thermostats operate on a time-of-day clock which enables the user to preprogram the thermostat for specific start and stop times during the day when the thermostat will operate with a set-back temperature setting.

Direct fired heaters and radiant heaters and other heating and/or cooling environmental climate control devices can be used in large open-space areas, for example, a warehouse, a shopping mall, storage facility, a distribution center, a factory or an ice rink. Such large, mixed-use spaces can have zones that are occupied by individuals and other spaces that are normally unoccupied by individuals. In some examples, the direct fired heaters maintain a selected temperature for the overall interior environment, while the radiant heaters create an enveloped heated area within the interior environment that encourages. These two distinct heaters (and other heating and/or cooling environmental climate control devices) can be, however, separate and distinct components that operate apart from each other.

The present application is further directed to methods of making the various elements of the systems and apparatus herein, including making the systems and apparatus themselves from such elements, as well as to methods of using the same, or otherwise as desired.

All terms used herein are used in accordance with their ordinary meanings unless the context or definition clearly indicates otherwise. Also unless expressly indicated otherwise, in the specification the use of "or" includes "and" and vice-versa. Non-limiting terms are not to be construed as limiting unless expressly stated, or the context clearly indicates, otherwise (for example, "including," "having," and "comprising" typically indicate "including without limitation"). Singular forms, including in the claims, such as "a,"

"an," and "the" include the plural reference unless expressly stated, or the context clearly indicates, otherwise.

Unless otherwise stated, adjectives herein such as "substantially" and "about" that modify a condition or relationship characteristic of a feature or features of an embodiment, indicate that the condition or characteristic is defined to within tolerances that are acceptable for operation of the embodiment for an application for which it is intended.

The scope of the present devices, systems and methods, etc., includes both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

From the foregoing, it will be appreciated that, although specific embodiments have been discussed herein for purposes of illustration, various modifications may be made without deviating from the spirit and scope of the discussion herein. Accordingly, the systems and methods, etc., include such modifications as well as all permutations and combinations of the subject matter set forth herein and are not limited except as by the appended claims or other claim having adequate support in the discussion and figures herein.

What is claimed is:

1. A heating ventilation cooling (HVAC) system comprising:
    at least two separate and distinct environmental climate control devices, the at least two distinct environmental climate control devices both serving a single mixed use open space consisting essentially of a large open space having at least a first selected temperature zone abutting a second selected temperature zone;
    a central uniform control unit operably connected to the at least two environmental climate control devices to control combined operation of the distinct environmental climate control devices, the central uniform control unit also operably connected to at least a first temperature sensor located in the first selected temperature zone and to a second temperature sensor located in the second selected temperature zone; wherein,
    the central uniform control unit is further configured such that, based on a first selected temperature set point for the first selected temperature zone, a second selected temperature set point for the second selected temperature zone, wherein the second selected temperature set point is different from the first selected temperature set point, and on information from the first and second temperature sensors, the central uniform control unit controls combined operation of the at least two distinct environmental climate control devices to establish substantially different temperatures between the first and second selected temperature zones, wherein the at least two distinct environmental climate control devices further comprise at least one ventilation device, and the central uniform control unit controls, via the ventilation device, ventilation in the single mixed use open space to support the substantially different temperatures between the first and second selected temperature zones.

2. The heating ventilation cooling (HVAC) system of claim 1 wherein the at least two distinct environmental climate control devices comprise at least one radiant heater and at least one direct fired heater.

3. The heating ventilation cooling (HVAC) system of claim 2 wherein the central uniform control unit controls equipment staging for the direct fired heater based on information from a pressure sensor centrally located in the in single mixed use open space and operably connected to the central uniform control unit.

4. The heating ventilation cooling (HVAC) system of claim 1 wherein the at least two distinct environmental climate control devices comprise at least one climate control heating device and at least one climate control cooling device.

5. The heating ventilation cooling (HVAC) system of claim 1 wherein the at least two distinct environmental climate control devices comprise at least two climate control heating devices and at least one climate control cooling device.

6. The heating ventilation cooling (HVAC) system of claim 1 wherein the system further comprises at least one pressure sensor operably connected to the central uniform control unit such that the central uniform control unit selectively controls air pressure in the single mixed use open space to support the substantially different temperatures between the first and second selected temperature zones.

7. The heating ventilation cooling (HVAC) system of claim 1 wherein the system further comprises at least one contaminant sensor operably connected to the central uniform control unit such that the central uniform control unit selectively controls HVAC in the single mixed use open space based on information provided by the contaminant sensor.

8. The heating ventilation cooling (HVAC) system of claim 7 wherein the contaminant comprises at least one of carbon monoxide (CO) or nitrous oxide (NOX).

9. The heating ventilation cooling (HVAC) system of claim 1 wherein the first selected temperature zone having the first temperature is configured to be occupied by people and the second selected temperature zone having the second, substantially different temperature is configured to not be occupied by people.

10. The heating ventilation cooling (HVAC) system of claim 9 wherein the system further comprises at least one occupancy sensor operably connected to the central uniform control unit.

11. The heating ventilation cooling (HVAC) system of claim 10 wherein the central uniform control unit is configured to adjust the temperature in the first selected temperature zone when the occupancy sensor senses people in the first selected temperature zone.

12. The heating ventilation cooling (HVAC) system of claim 1 wherein the large open space is at least one of a factory, a warehouse, or a distribution center.

13. The heating ventilation cooling (HVAC) system of claim 1 wherein each separate and distinct environmental climate control device of the HVAC equipment operates in stand-alone mode according to its stand-alone sequence of operations in the absence of instructions from the central uniform control unit.

14. The heating ventilation cooling (HVAC) system of claim 1 wherein the central uniform control unit controls the distinct environmental climate control devices to provide outside air in quantities greater than needed solely for heating of the first and second selected temperature zones.

15. The heating ventilation cooling (HVAC) system of claim 1 wherein the central uniform control unit controls equipment staging for the direct fired heaters based on a centralized pressure control.

16. A heating ventilation cooling (HV AC) system comprising:
- at least two separate environmental climate control devices, the at least two separate and distinct environmental climate control devices both serving a single mixed use open space consisting essentially of a large open space having at least a first selected HVAC-controlled zone abutting a second selected HV AC-controlled zone;
- a central uniform control unit operably connected to the at least two environmental climate control devices, the central uniform control unit operably connected to at least one detection device providing information about at least one HVAC-conditioned quality in the single mixed use open space; wherein,
- the central uniform control unit is further configured such that, based on a first selected HVAC set point for the first selected HVAC-controlled zone, a second selected HVAC set point for the second selected HVAC-controlled zone, wherein the second selected HVAC set point is different from the first selected HV AC set point, and on information from detection device, the central uniform control unit controls combined operation of the at least two separate environmental climate control devices to establish substantially different temperatures between the first and second selected HV AC-controlled zones, wherein the at least two distinct environmental climate control devices further comprise at least one ventilation device, and the central uniform control unit controls, via the ventilation device, ventilation in the single mixed use open space to support the substantially different temperatures between the first and second selected temperature zones.

17. The heating ventilation cooling (HVAC) system of claim 16 wherein the HVAC-conditioned quality is temperature.

18. The heating ventilation cooling (HVAC) system of claim 16 wherein the HVAC-conditioned quality is contaminant level.

19. The heating ventilation cooling (HVAC) system of claim 16 wherein the at least two separate environmental climate control devices are at least two separate and distinct environmental climate control devices.

20. The heating ventilation cooling (HVAC) system of claim 16 wherein the at least two separate environmental climate control devices comprise at least one radiant heater and at least one of a direct fired heater and an indirect fired heater.

21. The heating ventilation cooling (HVAC) system of claim 20 wherein the central uniform control unit controls equipment staging for the direct fired heater or the indirect fired heater based on information from a pressure detection device centrally located in the single mixed use open space and operably connected to the central uniform control unit.

22. The heating ventilation cooling (HVAC) system of claim 16 wherein the at least two separate environmental climate control devices comprise at least one climate control heating device and at least one climate control cooling device.

23. The heating ventilation cooling (HVAC) system of claim 16 wherein the at least two separate environmental climate control devices comprise at least two climate control heating devices and at least one climate control cooling device.

24. The heating ventilation cooling (HVAC) system of claim 16 wherein the system further comprises at least one pressure detection device operably connected to the central uniform control unit such that the central uniform control unit selectively controls air pressure in the single mixed use open space to support the substantially different temperatures between the first and second selected HVAC-controlled zones.

25. The heating ventilation cooling (HVAC) system of claim 16 wherein the system further comprises at least one contaminant detection device operably connected to the central uniform control unit such that the central uniform control unit selectively controls HVAC in the single mixed use open space based on information provided by the contaminant detection device.

26. The heating ventilation cooling (HVAC) system of claim 25 wherein the contaminant comprises at least one of carbon monoxide (CO), carbon dioxide ($CO_2$), nitrous oxide (NOX), or hydrogen.

27. The heating ventilation cooling (HVAC) system of claim 16 wherein the first selected HVAC-controlled zone has a first HVAC-conditioned quality configured to be occupied by people and the second selected HVAC-controlled zone has a second, substantially different HVAC-conditioned quality that is configured to not be occupied by people.

28. The heating ventilation cooling (HVAC) system of claim 20 wherein the first selected HVAC-controlled zone has a first HVAC-conditioned quality configured to be occupied by people and the second selected HVAC-controlled zone has a second, substantially different HVAC-conditioned quality that is configured to not be occupied by people.

29. The heating ventilation cooling (HVAC) system of claim 28 wherein the system further comprises at least one occupancy detection device operably connected to the central uniform control unit.

30. The heating ventilation cooling (HVAC) system of claim 29 wherein the central uniform control unit is configured to adjust the temperature in the first selected HVAC-controlled zone when the occupancy detection device senses people in the first selected HVAC-controlled zone.

31. The heating ventilation cooling (HVAC) system of claim 30 wherein the large open space is at least one of a warehouse, a shopping mall, storage facility, a distribution center, a factory or an ice rink.

32. The heating ventilation cooling (HVAC) system of claim 16 wherein each separate environmental climate control device of the HVAC equipment operates in stand-alone mode according to its stand-alone sequence of operations in the absence of instructions from the central uniform control unit.

33. The heating ventilation cooling (HVAC) system of claim 16 wherein the central uniform control unit controls the separate environmental climate control devices to provide outside air in quantities greater than needed solely for heating of the first and second selected HVAC-controlled zones.

34. The heating ventilation cooling (HVAC) system of claim 16 wherein the central uniform control unit controls equipment staging for the direct fired heaters based on a centralized pressure control.

35. A building comprising the heating ventilation cooling (HVAC) system of claim 1.

36. A method comprising manufacturing an HVAC system, the method comprising:
In a single mixed use open space consisting essentially of large open space, providing at least two separate and distinct environmental climate control devices, the two distinct environmental climate control devices configured to serve the single mixed use open space to create within the large open space of the single mixed use open space at least a first selected temperature zone abutting a second selected temperature zone;
operably connecting a central uniform control unit to the at least two environmental climate control devices, the central uniform control unit configured to control combined operation of the distinct environmental climate control devices, the central uniform control unit also operably connected to at least a first temperature sensor located in the first selected temperature zone and to a second temperature sensor located in the second selected temperature zone; wherein,
configuring the central uniform control unit such that, based on a first selected temperature set point for the first selected temperature zone, a second selected temperature set point for the second selected temperature zone, wherein the second selected temperature set point is different from the first selected temperature set point, and on information from the first and second temperature sensors, the central uniform control unit controls combined operation of the at least two distinct environmental climate control devices to establish substantially different temperatures between the first and second selected temperature zones, wherein the at least two distinct environmental climate control devices further comprise at least one ventilation device, and the central uniform control unit controls, via the ventilation device, ventilation in the single mixed use open space to support the substantially different temperatures between the first and second selected temperature zones.

37. A method comprising using an HVAC system comprising:
in a single mixed use open space consisting essentially of a large open space, providing the HVAC system comprising at least two separate and distinct environmental climate control devices, the two distinct environmental climate control devices configured to serve the single mixed use open space to create within the large open space of the single mixed use open space at least a first selected temperature zone abutting a second selected temperature zone, the HVAC system also comprising a central uniform control unit operably connected to at least a first temperature sensor located in the first selected temperature zone and to a second temperature sensor located in the second selected temperature zone; wherein,
configuring the central uniform control unit such that, based on a first selected temperature set point for the first selected temperature zone, a second selected temperature set point for the second selected temperature zone, wherein the second selected temperature set point is different from the first selected temperature set point, and on information from the first and second temperature sensors, the central uniform control unit controls combined operation of the at least two distinct environmental climate control devices to establish substantially different temperatures between the first and second selected temperature zones, wherein the at least two distinct environmental climate control devices further comprise at least one ventilation device, and the central uniform control unit controls, via the ventilation device, ventilation in the single mixed use open space to support the substantially different temperatures between the first and second selected temperature zones.

38. A method comprising establishing substantially different temperatures between a first selected temperature zone and a second selected temperature zone both located in a single mixed use open space consisting essentially of a large open space using at least two separate and distinct environmental climate control devices, the method comprising:
in the single mixed use open space, providing an HVAC system comprising at least two separate and distinct environmental climate control devices, the two distinct environmental climate control devices configured to serve the single mixed use open space to create within the large open space of the single mixed use open space the first selected temperature zone abutting the second selected temperature zone, the HVAC system also comprising a central uniform control unit operably connected to at least a first temperature sensor located in the first selected temperature zone and to a second temperature sensor located in the second selected temperature zone; wherein,
configuring the central uniform control unit such that, based on a first selected temperature set point for the first selected temperature zone, a second selected temperature set point for the second selected temperature zone, wherein the second selected temperature set point is different from the first selected temperature set point, and on information from the first and second temperature sensors, the central uniform control unit controls combined operation of the at least two distinct environmental climate control devices to establish the substantially different temperatures between the first and second selected temperature zones, wherein the at least two distinct environmental climate control devices further comprise at least one ventilation device, and the central uniform control unit controls, via the ventilation device, ventilation in the single mixed use open space to support the substantially different temperatures between the first and second selected temperature zones.

39. A building comprising the heating ventilation cooling (HVAC) system of claim 16.

40. A method comprising manufacturing a system according to claim 16.

41. A method comprising using a system according to claim 16.

42. A method comprising establishing substantially different temperatures between the first and second selected temperature zones using at least two separate environmental climate control devices according to claim 16.

* * * * *